(12) United States Patent
Bonanni et al.

(10) Patent No.: US 9,606,240 B2
(45) Date of Patent: Mar. 28, 2017

(54) VEHICLE DETERMINATION SYSTEM AND METHOD USING A KALMAN FILTER AND CRITICAL MILEPOST DATA

(75) Inventors: Pierino Gianni Bonanni, Clifton Park, NY (US); David So Keung Chan, Niskayuna, NY (US); Harry Kirk Mathews, Clifton Park, NY (US); Pramod Vachhani, Bangalore (IN)

(73) Assignee: General Electric Company, Niskayuna, NY (US)

( * ) Notice: Subject to any disclaimer, the term of this patent is extended or adjusted under 35 U.S.C. 154(b) by 2280 days.

(21) Appl. No.: 11/998,103

(22) Filed: Nov. 27, 2007

(65) Prior Publication Data

US 2009/0138199 A1    May 28, 2009

(51) Int. Cl.
G01S 19/47    (2010.01)
G01C 21/16    (2006.01)
G01C 21/28    (2006.01)
G01S 19/50    (2010.01)

(52) U.S. Cl.
CPC ............ G01S 19/47 (2013.01); G01C 21/165 (2013.01); G01C 21/28 (2013.01); G01S 19/50 (2013.01)

(58) Field of Classification Search
CPC .............................. G01C 21/165; G01S 19/30
USPC .................................................. 701/480, 479
See application file for complete search history.

(56) References Cited

U.S. PATENT DOCUMENTS

| | | | |
|---|---|---|---|
| 5,129,605 A | 7/1992 | Burns et al. | |
| 5,332,180 A | 7/1994 | Peterson et al. | |
| 5,390,125 A * | 2/1995 | Sennott et al. | ............... 701/214 |
| 6,641,090 B2 | 11/2003 | Meyer | ...................... 246/122 R |
| 7,096,096 B2 * | 8/2006 | Kane et al. | ..................... 701/19 |
| 2003/0163255 A1 | 8/2003 | Ishigami et al. | |
| 2004/0140405 A1 | 7/2004 | Meyer | ...................... 246/122 R |

FOREIGN PATENT DOCUMENTS

| | | | |
|---|---|---|---|
| EP | 0736441 A1 | 10/1996 | |
| WO | WO2005/048000 | 5/2005 | ............. G06F 17/00 |

OTHER PUBLICATIONS

EP 0736441 English Abstract.
PCT International Search Report, International Application No. PCT/US2008/077635.
PCT Written Opinion Of The International Searching Authority, International Application No. PCT/US2008/077635.

* cited by examiner

*Primary Examiner* — Ramsey Refai
(74) *Attorney, Agent, or Firm* — Pabitra K. Chakrabarti

(57) ABSTRACT

A vehicle location determination system and method provide an estimate of real time location of the vehicle along a route in response solely to vehicle GPS information and vehicle speed information such that the estimated real time distance is robust to errors and disturbances associated with both the vehicle GPS information and vehicle speed information to ensure the estimated real time location information is accurate.

27 Claims, 5 Drawing Sheets

VEHICLE DETERMINATION SYSTEM AND METHOD USING A KALMAN FILTER AND CRITICAL MILEPOST DATA

BACKGROUND

The invention relates generally to determination of vehicle location, and, in particular, to a system and method for accurately and timely determining location/distance information for vehicles on a route, including, for example, trains on their tracks.

A need presently exists in vehicular (i.e. train) asset management and control applications to provide accurate and timely distance information for vehicles along a route, such as, but not limited to, trains on their tracks. An automatic controller in a locomotive pacing application, for example, provides throttle (notch) and braking commands to a locomotive in order that the locomotive follow a pre-planned speed profile versus distance along the track. In such an application, it is necessary to know the real-time location of the locomotive along the track. A locomotive position sensor or location determination system is therefore required.

One of the critical components of an automatic train control system is a sensor or sensor system that can provide accurate real-time location of the train on the track. Such a system must display robustness to errors and disturbances that are likely to be encountered in the railroad environment in order to be safely deployed. Such a system, for example, must provide plausible position information even if the sensors employed become subject to transient errors or intermittent lapses.

One of two methods has been typically employed to provide a location determination system (LDS). The first is a "dead reckoning" method based on measured velocity, the latter derived from a measurement of the rotational rate of one or more wheels and the corresponding wheel diameter. Position is computed simply by integrating the speed measurement, starting from a known initial position value.

The second method is based on real-time measurement of geographic coordinates with a GPS sensor. The coordinates are compared to track coordinates in a track database, and an association is made to a specific point in the track database based on minimizing the distance between the measured geographic location (latitude and longitude) and locations in the track database. More specifically a Kalman filter has been employed in conjunction with orthogonal acceleration measurements, turn-rate measurements, and wheel-mounted tachometer information for tracking movement through turnouts (to determine track occupancy) and for estimating along-track position, but that does not take into consideration certain errors and disturbances such as, for example, cumulative distance errors that are likely to be encountered along the specific track.

Accordingly, there exists a need for a reliable system and method for providing optimal estimation of real-time vehicle distance along a route such as, but not limited to a train track, and that is robust to errors and disturbances that are likely to be encountered in the specific route, i.e. railroad environment in order to be safely deployed and to ensure the distance estimation is accurate.

BRIEF DESCRIPTION

Briefly, in accordance with one embodiment of the present invention, a system and method are provided for determining vehicular location/distance along a route.

According to one embodiment, a vehicle location determination system (LDS) is configured to estimate real time location of the vehicle along a route in response solely to GPS information and vehicle speed information such that the estimated real time distance is robust to errors and disturbances associated with both the GPS information and vehicle speed information to ensure the estimated real time location information is accurate.

According to another embodiment, a method of determining real time location of a vehicle along a route comprises:
measuring GPS information associated with the vehicle;
measuring speed information associated with the vehicle; and
estimating real time distance of the vehicle along the route solely in response to the GPS information and the vehicle speed information such that the estimated real time distance is robust to errors and disturbances associated with both the GPS information and vehicle speed information to ensure the estimated real time location information is accurate.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Particular embodiments of a locomotive location determination system (LDS) are described herein below with reference to FIGS. 1-7. The embodiments employ vehicle GPS sensor measurements in conjunction with vehicle velocity information, and also employ a Kalman Filter for optimal estimation of real-time location position along a route. A Kalman Filter is employed in one embodiment to compensate for time lapses between successive GPS measurements, during which a fast moving vehicle such as a train, for example, undergoes a significant change in position.

Kalman Filtering desirably provides a technique to implement a maximum likelihood estimator in a recursive fashion to yield position measurements that are robust to a number of errors and disturbances common to the railroad environment, including without limitation, velocity bias due to unknown or changing wheel slippage and/or wheel diameter, which is caused by the gradual wear of the wheels. Although Kalman Filters are well known, those skilled in the art will appreciate the structure associated with a particular Kalman Filter is distinct to the problem to be solved when using such a Kalman Filter.

Another source of disturbances is the intermittent failure of the GPS sensor to provide accurate or timely geographic measurements, which arises when visibility to the GPS satellite constellation is compromised by travel, for example, through tunnels or along hilly or urban terrain.

Those skilled in the art will readily appreciate the present invention is not so limited however, and that other sensor types, either for purpose of augmenting accuracy and robustness, or to achieve the same performance with less expensive or more reliable sensors, can just as easily be employed to achieve the desired results according to the principles described herein.

Figure 1:
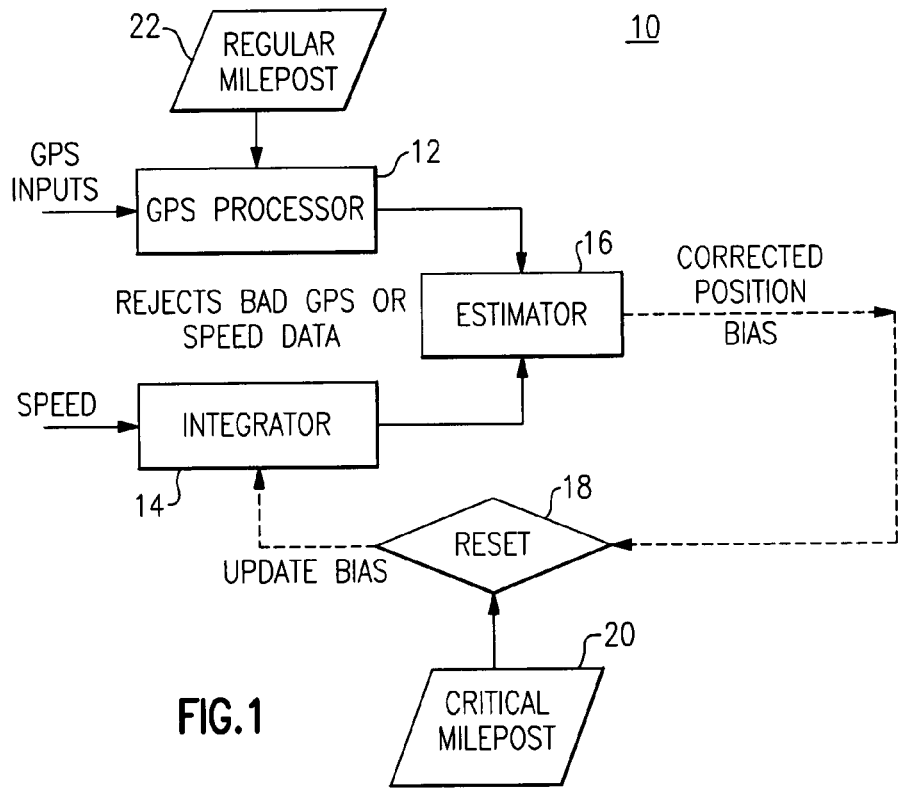
FIG. 1 is a flow chart illustrating the basic operation of a train location determination system (LDS), in accordance with one embodiment of the present invention.

Looking now at FIG. 1, a flow chart illustrates the basic operation of a location determination system (LDS) 10, in accordance with one embodiment of the present invention. The LDS system 10 is a Kalman Filter based system in which the Kalman Filter is configured to include a GPS processing module 12 that operates to receive and process the most recent GPS information via projection of GPS values onto a database. The projection calculation is carried out only when the presently active GPS sensor (enumerated as 204 in FIG. 8) transmits updated values (asynchronous in nature) that allow online identification of changes in Latitude/Longitude. A distance estimate is provided via a speed integration module 14 that also forms a portion of the Kalman Filter. A Kalman Filter estimator 16 employs both GPS sensor data (204 in FIG. 8) and speed sensor data (enumerated as 206 in FIG. 8) to determine a robust distance measurement along a route. A reset feature 18 also included within the Kalman Filter intermittently resets the estimator 16 and provides a corrected reference value of speed bias based on a critical milepost 20. Critical milepost module 20 comprises identified entries in the database where the estimator 16 will be reset. Regular milepost module 22 comprises entries in the database with latitude/longitude and footage data that are employed during GPS processing.

Figure 2:
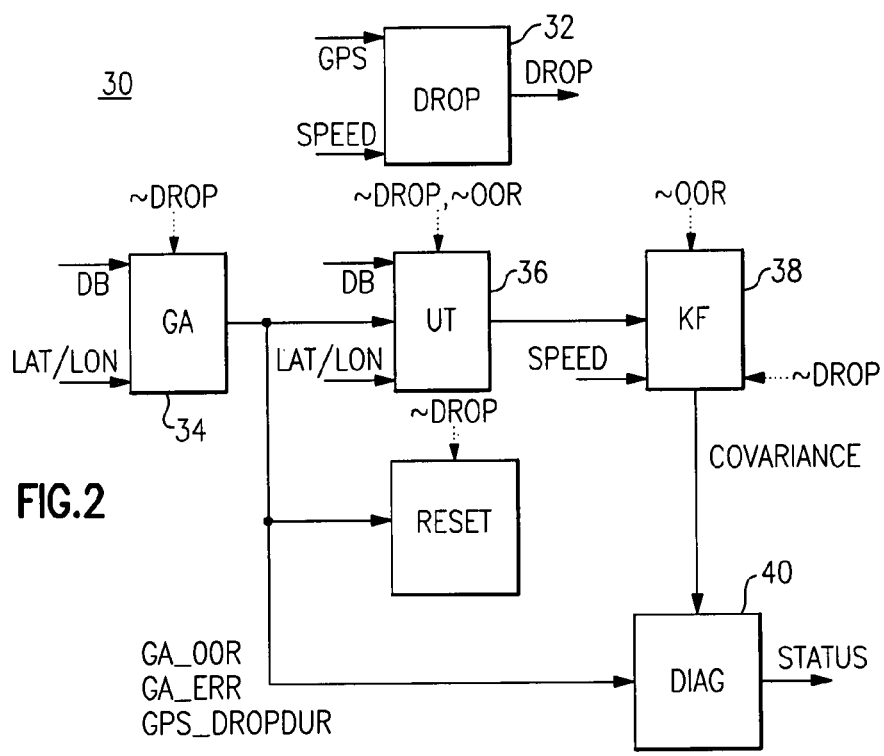
FIG. 2 is a flow chart illustrating in more detail, the various operations being carried out by the train LDS shown in FIG. 1, according to one embodiment.

FIG. 2 is a flow chart 30 illustrating in more detail, the various operations being carried out by the LDS 10 shown in FIG. 1, according to one embodiment. A drop identification module 32 looks at GPS values and determines whether they have updated in the present instant. GA sub-module 34 performs a great arc (GA) calculation in association with the GPS processing carried out via GPS processing module 12 only when a GPS value updates. A UT sub-module 36 also included within the Kalman Filter GPS processing module 12 performs an unscented transformation (UT) for the covariance calculations required during GPS processing that is carried out only when the GPS value updates and the value is in range of the database. KF module 38 is a Kalman Filter estimator used for fusing both the speed estimate and the present GPS value. A diagnostic module 40 sends out a status/goodness measure based on information, including without limitation, out of range data, error data, and dropped data indicators, received from various modules as shown in FIG. 2.

Figure 3:
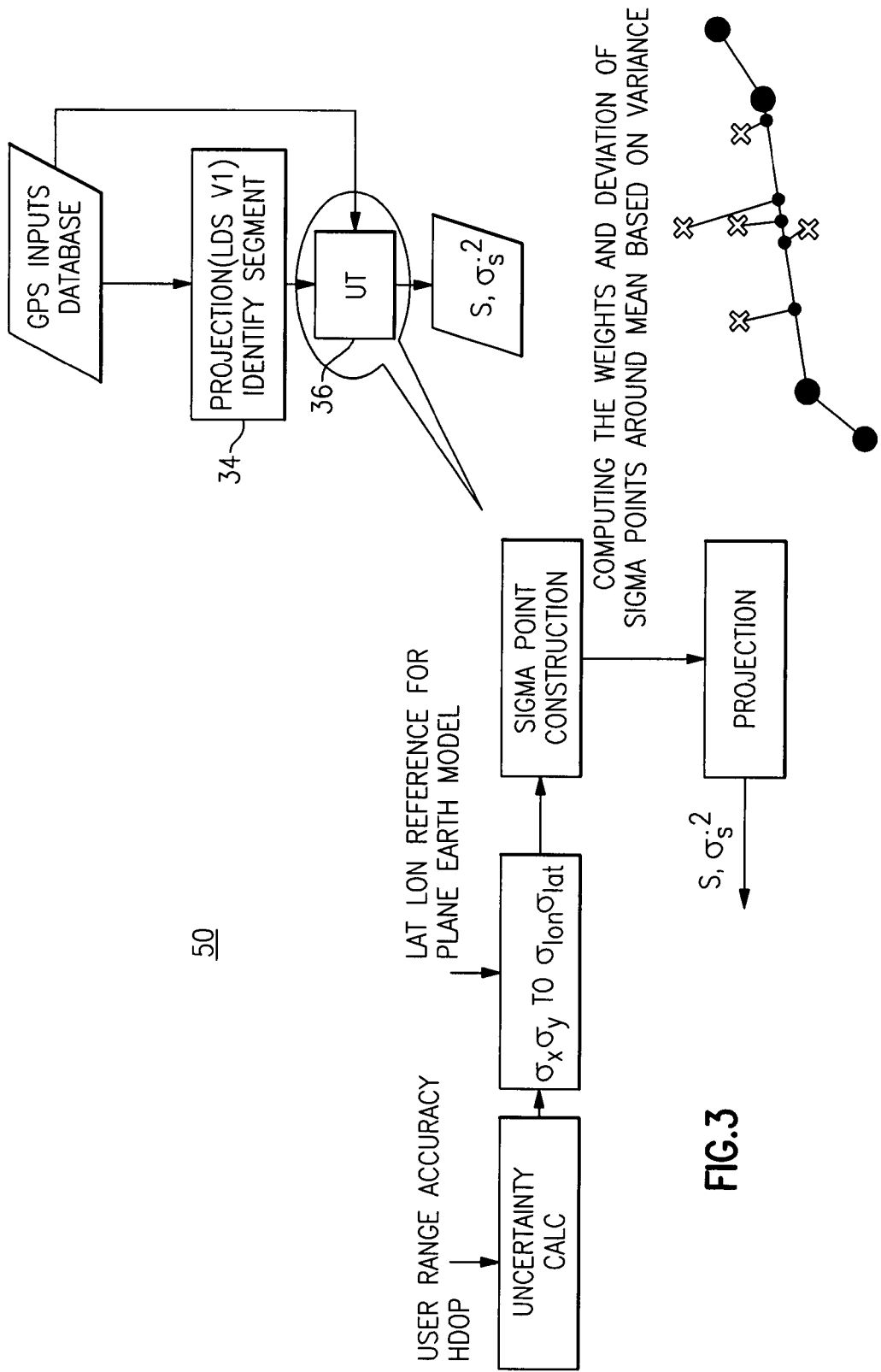
FIG. 3 is a flow chart illustrating operations performed by the LDS GPS processor shown in FIG. 1, and includes without limitation, the great arc projection and Unscented Transformation shown in FIG. 2, according to one embodiment.

FIG. 3 is a flow chart 50 illustrating operations performed by the LDS GPS processing module 12 shown in FIG. 1, and includes without limitation, the great arc projection 34 and unscented transformation 36 shown in FIG. 2, according to one embodiment. The great arc projection 34 is a series of mathematical calculations involving the orthogonal projection of latitude/longitude coordinates on a segment drawn between two latitude/longitude points from the database. This segment would then be a great arc, drawn such that is divides the earth into two halves when extrapolated around the sphere, as required for one embodiment, since these calculations are performed over a spherical coordinate system. The unscented transformation (UT) 36 is a technique suggested in literature for covariance calculations through nonlinear functions or operations. The UT 36 provides uncertainty in the position on route due to the uncertainty in the coordinates provided by the GPS information.

A quick search operation, according to one embodiment, is another function that can be implemented via the GPS processing module 12 that precedes the great arc calculation. Since the length of the database can be very great depending on the length of the track, it can be time consuming to carry out the rigorous great arc projection on all segments to identify the right one. A quick search operation therefore, which carries out a simple Euclidean distance calculation to determine the closest point in the database from the present GPS coordinate is then followed by the rigorous great arc calculation for only a small window around that closest point in the database.

Figure 4:
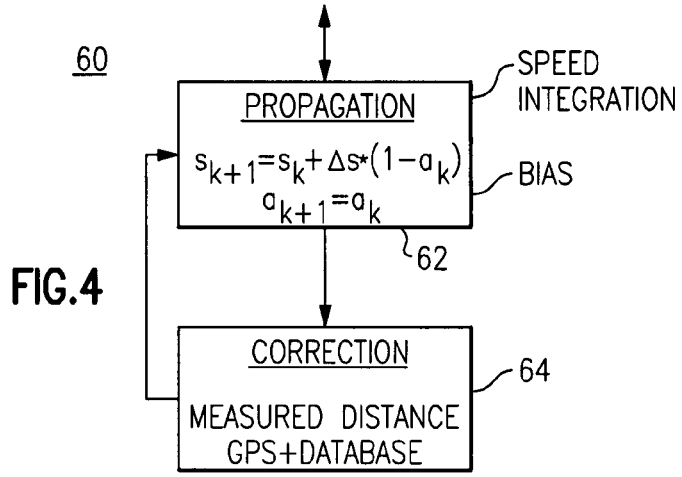
FIG. 4 is a flow chart illustrating operation of the LDS Kalman Filter estimator shown in FIG. 2, according to one embodiment.

FIG. 4 is a flow chart 60 illustrating operation of the LDS Kalman Filter estimator 38 used for data fusion of the speed and GPS information, shown in FIG. 2, according to one embodiment. Kalman Filter estimator 38 provides the technical advantage of flexibility when integrating speed based distance estimates (available every 100 milliseconds, for example, according to one embodiment) with GPS based distance estimates (asynchronous update from 1 second to 10 seconds, for example, if it is an extended drop according to one embodiment). Kalman Filter estimator 38 also provides the technical advantage of robustness to accommodate uncertainties that may occur with GPS or speed measurements.

The foregoing technical advantages are achieved by letting synchronous (constant rate) speed based distance updates be a part of the propagation step 62 and letting the GPS based distance estimate be a part of the correction step 64, carried out as and when the GPS information updates. The Kalman Filter estimator 38 has two states comprising 1) position along a route i.e. train track, and 2) speed bias, according to one embodiment. The bias in speed is the multiplicative bias which increases or decreases with speed, wherein the source for such a bias could be, for example, wheel slippage, incorrectly entered wheel diameter or change in the value due to wear. A technical advantage of estimating bias is increased accuracy available when relying on speed integration alone in a tunnel or a valley (GPS blind zone) where the pure speed integrator can drift away from the truth due to the bias in speed.

Figure 5:
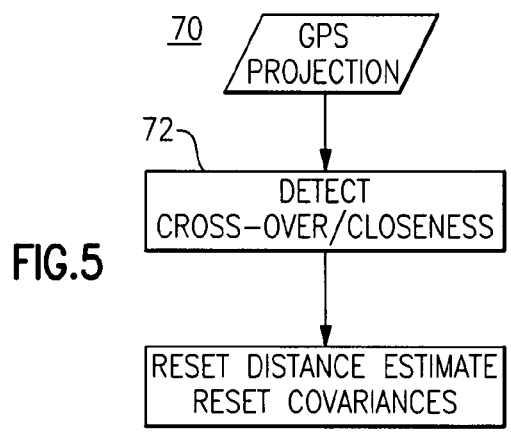
FIG. 5 is a flow chart illustrating operation of the LDS reset logic for the Kalman Filter shown in FIG. 2, according to one embodiment.

FIG. 5 is a flow chart 70 illustrating operation of the LDS reset logic for the Kalman Filter estimator 38 shown in FIG. 2, according to one embodiment. The LDS reset logic functions to recalibrate the distance estimate to the database value when, for example, a locomotive is at a station. The LDS reset logic also functions to reset the covariance values of the estimator discussed herein before so that no run away occurs for long trips. The foregoing functions are achieved by checking the closeness of the present coordinate to any of the identified critical mileposts 20 (entries in database identified for resets) as represented in block 72

Figure 6:
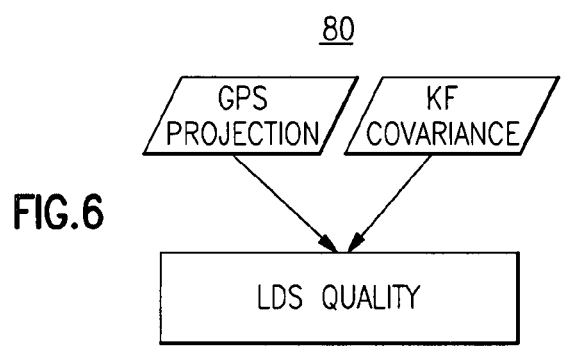
FIG. 6 is a flow chart illustrating diagnostic features of the LDS, according to one embodiment.

FIG. 6 is a flow chart 80 illustrating diagnostic features of the LDS 10 provided for by the diagnostic module 40 discussed herein before with reference to FIG. 2, according to one embodiment. The diagnostic module 40 checks three signals generated by the great arc module 34, including Out of Database Range, Projection Error and GPS Drop Duration signals. These signals are checked with respect to the provided thresholds; and the logic signals are converted into integer status signals. The diagnostic module 40 functions to monitor the Status signals as well as the covariance values associated with the Kalman Filter estimator 38 to provide a LDS quality estimate (i.e. 0-1 or 0-100%) which then indicates a measure of confidence to be assigned to the LDS distance estimate.

In summary explanation, a location determination system (LDS) 10 for vehicles such as, but not limited to, trains is implemented without the need for inertial navigation sensors such as required, for example, by some known track occupancy determination systems. LDS 10 employs features, including without limitation, estimator logic, including assignment and use of critical mileposts, as well as criteria for rejection of erroneous GPS coordinate data in accordance with the principles described herein. These features are not believed to exist in known location determination systems that offer solutions to different types of problems or that are otherwise incapable of providing LDS distance estimates anywhere near the levels of accuracy provided via LDS 10.

Figure 7:
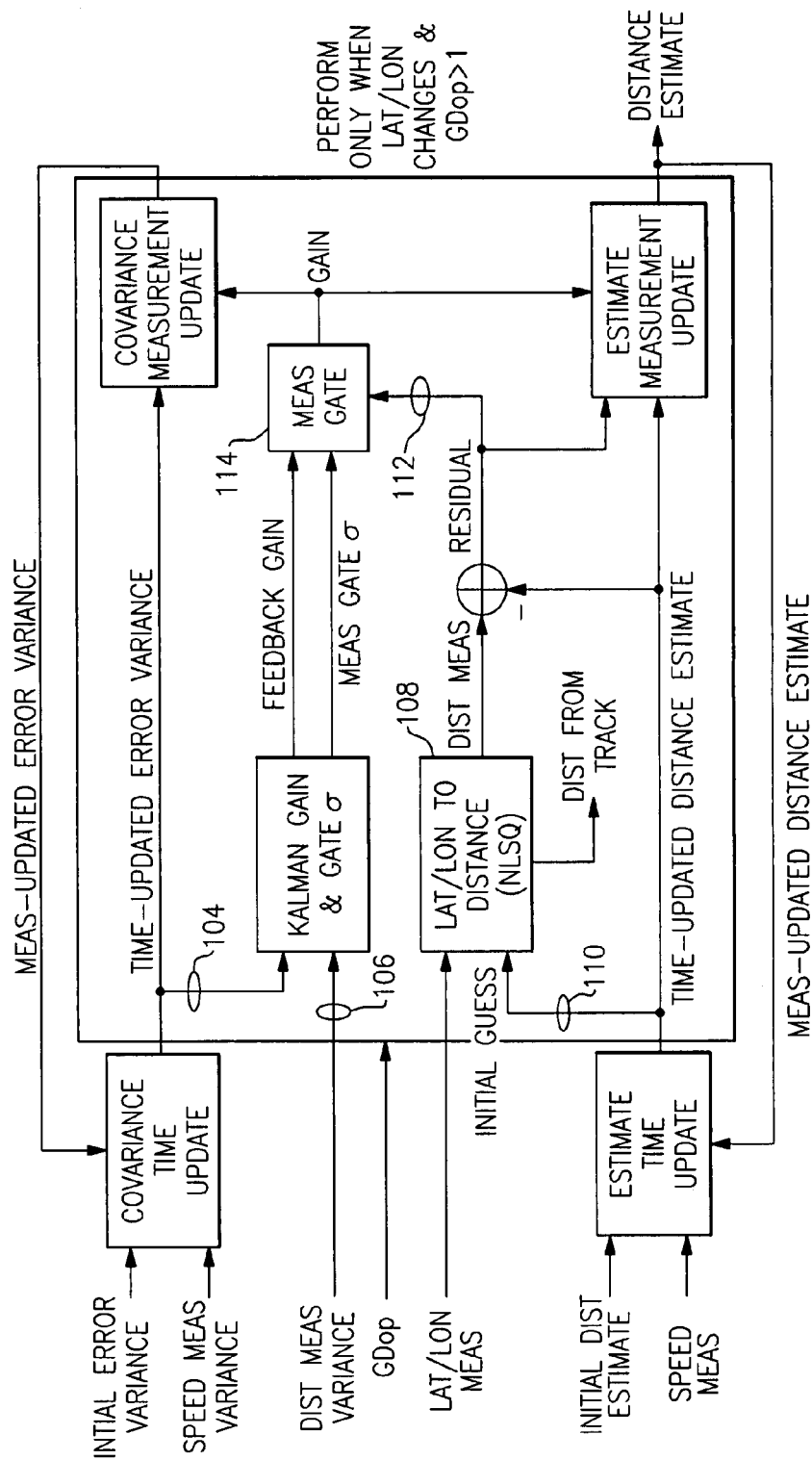
FIG. 7 is a flow diagram illustrating the basic operation of a train location determination system (LDS), in accordance with another embodiment of the present invention.

FIG. 7 is a flow diagram illustrating the basic operation of a location determination system (LDS) 100 comprising a single-state Kalman Filter, in accordance with another embodiment of the present invention. LDS 100 functions to determine the distance of a vehicle along a route from a fixed reference point, given a (latitude, longitude) versus cumulative distance database, a vehicle speed, and GPS measurements using the single-state Kalman Filter in conjunction with a two-dimensional (2D) nonlinear least squares algorithm.

LDS 100 operates to acquire then maintain a route, and re-acquire whenever the route is lost. Specifically, the route is acquired in response to filtered GPS measurements; and whenever the GPS drops out (GDOP<threshold), the route is maintained following a vehicle speed measurement until the GPS returns. The route is lost if N consecutive good GPS measurements fall outside a predicted gate, wherein the auto throttle control, if it exists, should be disabled until the route is re-acquired.

The single-state Kalman Filter operates to estimate the distance on the route using the vehicle speed as a noisy input 104 and GPS information as a noisy measurement 106. The GPS distance measurement is obtained from GPS (latitude, longitude) via a nonlinear least squares (NLSQ) algorithm 108, using predicted distance from the Kalman Filter as an initial guess 110.

Measurement updates are performed only when GDOP>threshold, and the residual 112 is within a predicted Kσ gate 114. A standard Kalman Filter gain allows continuous trading between vehicle speed and GPS measurements via dynamically specifiable respective error variances.

LDS 100 provides technical advantages over other Kalman Filter based systems including without limitation, faster estimation of the distance of a vehicle along a route from a fixed reference point, as well as simpler algorithm implementation while simultaneously achieving the desired level of accuracy under certain conditions.

Figure 8:
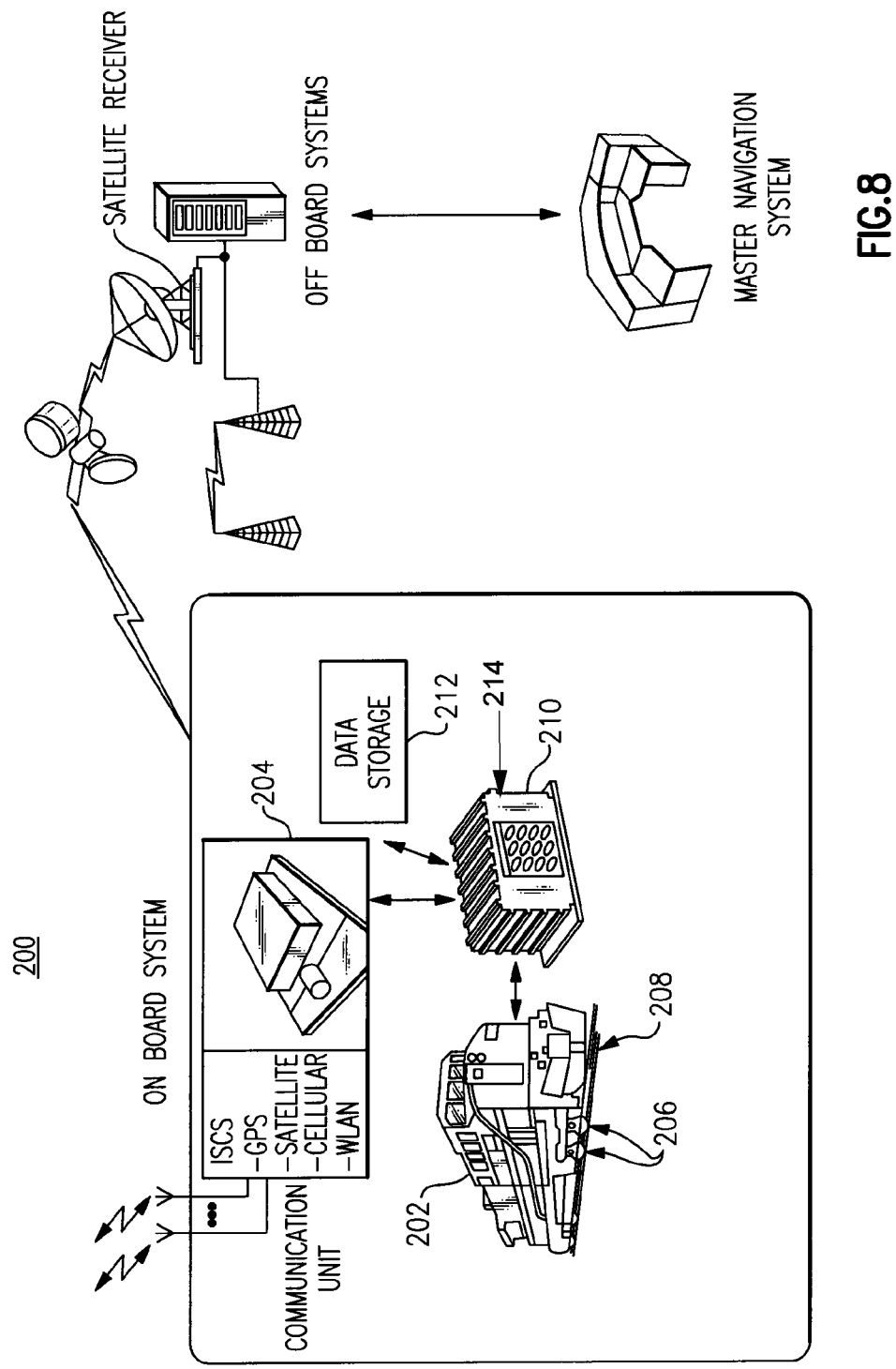
FIG. 8 is a pictorial diagram illustrating a locomotive location/distance determination system according to one embodiment.

FIG. 8 is a pictorial diagram illustrating a locomotive location/distance communication system 200 according to one embodiment. Locomotive location/distance communication system 200 depicts a locomotive 202 on a track 208 in which the locomotive 202 is configured with one or more GPS transceivers 204 and one or more speed sensors 206 that together operate to measure and send locomotive GPS data and locomotive speed data to an on-board LDS system 210 comprising great arc Kalman Filter 10 or non-linear least squares Kalman Filter 100. System 210 communicates with a master navigation system via a wireless communication system.

On-board LDS 210 may include without limitation, a computer or processor, 214 logic, memory, storage, registers, timing, interrupts, and the input/output signal interfaces as required to perform the Kalman Filter processing described herein before. The LDS 210, according to one embodiment, receives inputs from a data storage unit 212 that may store a database of parameters such as described above, at least one on-board speed sensor 206, and at least one GPS unit 204. It will be appreciated that while in an exemplary embodiment, all or most processing is described as resident in the LDS 210, such a configuration is illustrative only. Various processing and functionality may be distributed among one or more system elements without deviating from the scope and breadth of the claims.

The data storage unit 212 is configured with sufficient capacity to capture and record data to facilitate performance of the GPS processing, speed integration, estimation, projection and reset functions disclosed herein. In one embodiment, data storage unit 212 uses flash memory. Data storage unit 212 may also include non-volatile random access memory (RAM). The data storage unit 212 is comprised in one embodiment, of a solid-state, non-volatile memory of sufficient storage capacity to provide long-term data storage. Once again, it will be appreciated that while the data storage unit 212 is described as a separate entity from the LDS 210, either or both could be configured to be separate or combined, as well as being combined with other elements of the communication system 200. Further, it should be appreciated that while particular processing and functionality is disclosed herein, such processing and functionality is illustrative only to facilitate disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A vehicle location determination system (LDS) comprising:
   a computer or processor;
   a speed bias based speed integration module;
   a Kalman filter based estimator, wherein the computer or processor is programmed to estimate real time location of the vehicle along a route via the Kalman filter based estimator that estimates the real time location in response solely to both GPS information and vehicle speed information; and a critical milepost module comprising a database of identifying entries that are distinct and independent from the GPS information and the vehicle speed information, wherein the computer or processor is further programmed to reset the speed bias based integration module based upon the identifying entries in the database such that the estimated real time location is robust to cumulative errors and disturbances associated with both the GPS information and vehicle speed information to ensure the estimated real time location information is accurate.

2. The vehicle LDS of claim 1, wherein the computer or processor is further programmed to reject GPS data or vehicle speed data that exceeds respective threshold limits.

3. The vehicle LDS of claim 1, wherein the computer or processor is further programmed to intermittently reset and provide a corrected reference value of speed bias based on the identifying entries in the critical milepost database.

4. The vehicle LDS of claim 3, wherein the computer or processor is further programmed to process the most recent GPS information via projection of GPS values onto the critical milepost database.

5. The vehicle LDS of claim 4, wherein the database comprises known latitude data, longitude data, and cumulative distance data associated with the route.

6. The vehicle LDS of claim 4, wherein the projection is a great arc projection.

7. The vehicle LDS of claim 6, wherein the computer or processor is further programmed to generate a quality indicator signal associated with the estimated real time location information in response to GPS projection data and associated covariance data.

8. The vehicle LDS of claim 4, wherein the projection is a non-linear least squares projection.

9. The vehicle LDS of claim 1, wherein the Kalman filter based estimator comprises a two-state variable Kalman filter, wherein first state variable comprises vehicle position along the route and the second state variable comprises vehicle speed bias based upon the critical milepost database.

10. The vehicle LDS of claim 1, wherein the Kalman filter based estimator comprises a single-state variable Kalman filter, wherein the single-state variable comprises vehicle position along the route.

11. The vehicle LDS of claim 1, wherein the vehicle comprises a locomotive and the route comprises a locomotive track.

12. A method of determining real time location of a vehicle along a route, the method comprising:
providing a location determination system (LDS) comprising a computer or processor, a GPS processing module, speed bias based speed integration module, and a Kalman filter based estimator;
programming the computer or processor to measure GPS information via the GPS processing module, and measuring the GPS information via the GPS processing module associated with the vehicle;
programming the computer or processor to measure speed information via the speed bias based speed integration module and measuring the speed information via the speed bias based speed integration module associated with the vehicle;
estimating real time distance of the vehicle along the route solely in response to both the GPS information and the vehicle speed information via the Kalman filter based estimator; and
intermittently communicating a corrected value of speed bias to the speed bias based speed integration module and resetting the speed bias based speed integration module in response to both the corrected value of speed bias and predetermined critical milepost data that is distinct and independent of the GPS information and the vehicle speed information, such that the estimated real time distance is robust to cumulative errors and disturbances associated with both the GPS information and vehicle speed information to ensure the estimated real time location information is accurate.

13. The method of claim 12, further comprising rejecting GPS data or vehicle speed data via the Kalman filter based estimator that exceeds respective threshold limits.

14. The method of claim 12, wherein estimating real time distance of the vehicle along the route further comprises processing the most recent GPS information via projection of GPS values onto the database comprising the critical milepost entries and generating the corrected value of speed bias therefrom via the Kalman filter based estimator.

15. The method of claim 14, wherein projection of GPS values onto a database comprising the critical milepost entries comprises projection of GPS values onto a database comprising known latitude data, longitude data, and cumulative distance data associated with the route.

16. The method of claim 14, wherein projection of GPS values onto the critical milepost database comprises a great arc projection of GPS values onto a database comprising known latitude data, longitude data, and cumulative distance data associated with the route.

17. The method of claim 14, wherein projection of GPS values onto the critical milepost database comprises a non-linear least squares projection of GPS values onto a database comprising known latitude data, longitude data, and cumulative distance data associated with the route.

18. The method of claim 12, wherein estimating real time distance of the vehicle along the route comprises processing the GPS information and the vehicle speed information via the Kalman filter based estimator to generate a quality indicator signal associated with the estimated real time location information in response to GPS projection data and associated GPS covariance data.

19. The method of claim 12, wherein estimating real time distance of the vehicle along the route comprises processing the GPS information and the vehicle speed information via a two-state variable Kalman filter based estimator, wherein first state variable comprises vehicle position along the route and the second state variable comprises vehicle speed bias based upon the critical milepost database entries.

20. The method of claim 12, wherein estimating real time distance of the vehicle along the route comprises processing the GPS information and the vehicle speed information via a single-state variable Kalman filter based estimator, wherein the single-state variable comprises vehicle position along the route.

21. The method of claim 12, wherein estimating real time distance of the vehicle along the route comprises estimating real time distance of a locomotive along a locomotive track.

22. A vehicle location determination system (LDS) comprising:
a computer or processor;
a GPS processing module;
a speed integrator module;
a Kalman filter based estimator module; wherein the computer or processor is programmed to estimate real time distance of the vehicle along a route via the Kalman filter based estimator that estimates the real time location in response solely to both GPS information from the GPS processing module and vehicle speed information from the speed integrator module; and a critical milepost module comprising a database of identifying entries that are distinct and independent from the GPS information and the vehicle speed information, wherein the computer or processor is further programmed to reset the speed integrator module based upon the identifying entries in the database such that the estimated real time distance is robust to cumulative errors and disturbances associated with both the GPS information and vehicle speed information to ensure an estimated real time location is accurate.

23. The LDS of claim 22, wherein the identifying entries comprise:
longitude data;
latitude data; and
cumulative distance data, wherein the longitude data, latitude data, and cumulative distance data together define regular milepost and critical milepost estimation locations.

24. The LDS of claim 23, wherein the LDS further comprises a reset module and is further programmed to reset the speed integrator module via the reset module in response to an updated speed bias that is determined at each critical milepost identifying entry.

25. The LDS of claim 23, wherein the GPS processing module is programmed process the most recent GPS information via a great arc projection of GPS values onto the milepost database.

26. The LDS of claim 25, wherein the GPS processing module is further programmed to perform an unscented transformation (UT) for covariance calculations during GPS processing that is carried out only when a GPS value updates and the value is in range of the milepost database.

27. The LDS of claim 23, wherein the GPS processing module is programmed to process the most recent GPS information via a nonlinear least-squares projection of GPS values onto the milepost database.

* * * * *